Nov. 30, 1965  W. R. OTT  3,220,075
SELF-LOCKING SAFETY CLIP
Filed April 3 1964  3 Sheets—Sheet 1
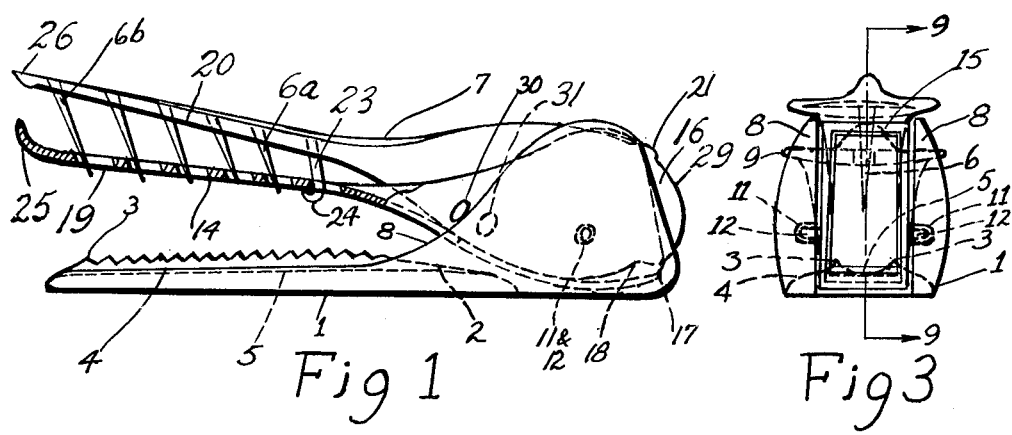
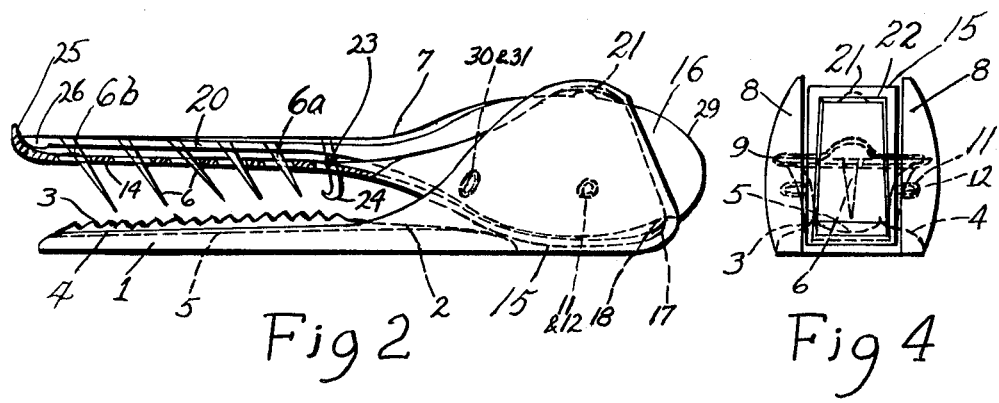
INVENTOR.
WILLIAM R. OTT
BY
George A. Schwenger
ATTORNEY.

Nov. 30, 1965 W. R. OTT 3,220,075
SELF-LOCKING SAFETY CLIP
Filed April 3 1964 3 Sheets-Sheet 2

INVENTOR.
WILLIAM R. OTT
BY George A. Schwenger
ATTORNEY.

Nov. 30, 1965      W. R. OTT      3,220,075

SELF-LOCKING SAFETY CLIP

Filed April 3 1964      3 Sheets-Sheet 3

INVENTOR.
WILLIAM R. OTT
BY
George A. Schwenger
ATTORNEY.

United States Patent Office 3,220,075
Patented Nov. 30, 1965

3,220,075
SELF LOCKING SAFETY CLIP
William R. Ott, 2676 Breezy Way, Cincinnati, Ohio
Filed Apr. 3, 1964, Ser. No. 357,057
6 Claims. (Cl. 24—160)

My invention relates to safety clips that are used to secure layers of fabric together such as overlapping ends of diapers for babies, bandages and other wrap around materials.

It is an object of my invention to provide a self locking safety pin to secure a diaper on an infant and protect the infant from injury by the safety pin.

Another object of my invention is to provide a safety clip that is readily slid on and about layers of fabric and by slight pressure locks the clip in position and keeps the fabric in a pre-arranged position.

A further object is to provide a self locking safety clip to secure overlapping layers of fabric in fixed relationship to each other. Also to insure that lateral motion of the fabrics in relation to the clip in locked position on the fabric will remain in the original pre-arranged overlapped position without tearing of the fabric.

These and other objects will become more apparent in the following description in conjunction with the drawings illustrating the preferred and alternate embodiment of my invention.

FIGURE 1 is a side elevation showing my clip in open position.

FIGURE 2 is a side elevation showing my clip in closed position.

FIGURE 3 is an end elevation showing the parts in open position.

FIGURE 4 is an end elevation showing the parts in closed position.

Figure 5:
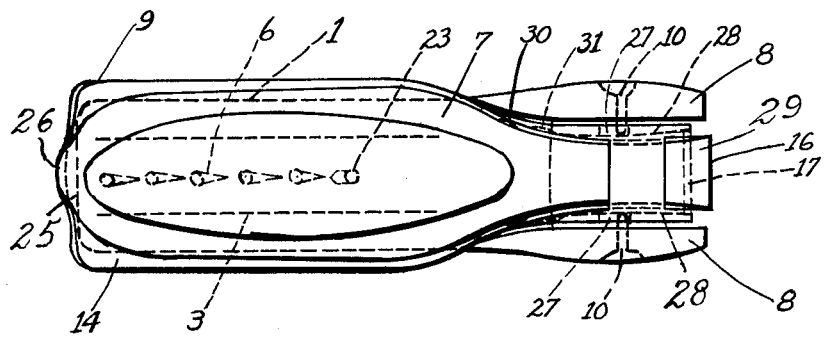
FIGURE 5 is a top elevation.

In FIGURES 1, 2, 3, 4 and 9 I have illustrated one construction of my clip which utilizes a fixed stud and in FIGURES 5, 6, 7 and 8 there is illustrated a construction having a fixed stud and a cam slot which is slidable on the pivot stud.

In the description similar parts have the same indicia since the parts are interchangeable in the two different structures which are practically identical except for the slot and a locking means to be explained.

One end of a base 1 has a solid portion 2 integral with which are two rows of serrations 3 raised above a top surface 4 of the base to form a concave channel 5 between the serrations. The serrations counteract against pointed pins 6 that are fixed in a slidable lever 7 (to be explained) when the pointed pins are held in locked position. The combination of the serrations and the pointed pins prevents lateral motion, in relation to the clip, of the layers of secured fabric because while depressing the pointed pins through the fabric, the fabric molds itself around the serrations and thereby frictionally retards the fabric from slippage. Another end of the base is bifurcated and has two vertical spreadable cheeks 8 between which a platen 9 is rotatably retained on studs 10 that are fixed in the spreadable cheeks. The lever 7 is slidably retained on the platen and rotatable with it as a unit. Referring to FIGURES 3 and 4 there is illustrated an alternate method for rotatably mounting the lever and the platen with it between the cheeks. In this case there are bearing holes 11 in the cheeks adapted to rotatably receive bearing studs 12 that are fixed on the sides 13 of a rectangular tubular frame end 15 of the platen in which an end of the lever is free to slide longitudinally within the tubular frame end.

Figures 6, 7:
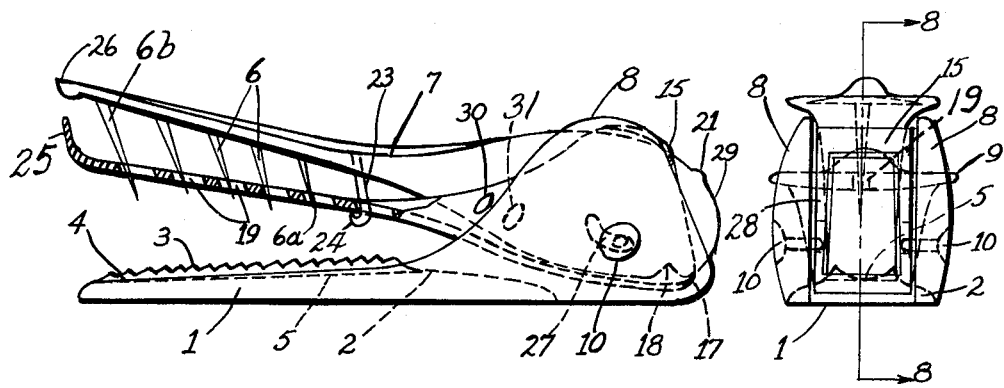
FIGURE 6 is a side elevation of an alternate clip utilizing a slot and pivot.
FIGURE 7 is an end elevation of the alternate clip shown in FIGURE 6.
Figure 8:
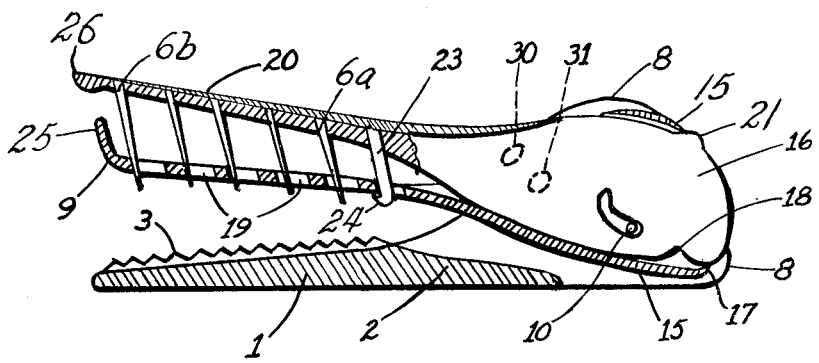
FIGURE 8 is a section in elevation taken on line 8—8 of FIGURE 7.
Figure 9:
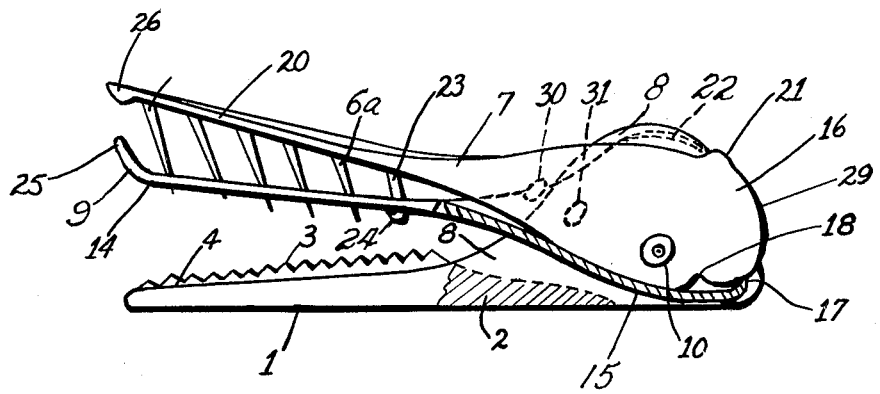
FIGURE 9 is a section in elevation taken on line 9—9 of FIGURE 3.

The spreadable cheeks are flexible and can be spread sufficiently to admit the studs and seat them rotatably within the bearing holes. This arrangement allows easy assembly of the lever and platen assembly to the base without additional elements or tools. The platen has a shank 14 terminating in the base portion of the tubular frame end of the platen. An end 16 of the lever as previously explained is slidably retained within the tubular end of the platen. The shank of the platen terminates in a pawl 17 adapted to hook into an indent 18 on the lever. When the lever is depressed it will slide and rotate in relation to the platen and the base until the pawl on the platen is engaged in the indent on the lever. Upon engagement of the pawl within the indent the platen and lever will be locked together and will rotate as a unit separately from the base which is stationary on the underside of the bottom layers of fabric. The platen has a multiple of elongated slots 19 for the pointed pins which allows the lever with the pointed pins secured in it to slide longitudinally in relation to the platen and base while the lever is being depressed to engage the pointed pins with the fabric to be pinned together and to bring all the parts into locked relationship. The pointed pins are fixed in the lever at an angle of approximately forty-five degrees with the underside 20 of the lever. The lengths of the pointed pins are progressively shorter one to the other starting at pointed pin 6b and ending with pointed pin 6a to enable the lever to be depressed without resistance of the pointed pin 6a or bending of the pointed pins and thereby allowing each of the pointed pins to penetrate all of the layers of the fabric. Fixed in the lever adjacent to the pointed pin 6a there is a pin 23 having a hooked end 24 that limits the amount of separation between the lever and platen when the clip is in an open condition. The hook limits the separation by engaging the underside of the platen. Referring to FIGURES 1, 2 and 9 there is illustrated a raised rib 21 which is fixed on the lever and rotatable with it. This rib is adapted to pass under and engage on the underside 22 of a top side of the rectangular tubular frame of the platen. The resultant pressure between the rib and top side of the tubular frame holds the pawl in the indent and locks the lever and platen in fixed relation to each other. On the inside of each of the cheeks there are depressions 31 adapted to be engaged by raised knobs 30 on the platen which together serve as a means to fix and lock the lever, platen and base in pinning position. Depressing the lever causes it to slide and rotate within the platen tubular housing until the pawl is engaged in the indent. Continued depression causes the rib and top side to engage and hold the pawl in the indent and to remain in engagement after which the depression and knob are engaged, and to lock the entire device in pinning position. An end 25 of the platen is curved to permit easy sliding of the clip over fabric layers to be clipped together, and also to shield an end 26 of the lever when the clip is in pinning condition. In FIGURE 6 there is an alternative method of mounting the lever and platen on the base wherein the studs 10 are fixed in the cheeks of the base. Cam slots 27 in sides 28 of the tubular housing of the platen are eccentric to the studs. These slots cause the platen together with the lever to slide and rotate in relation to the base and thereby obtain the maximum angular penetration of the needles through the fabrics being pinned together.

To fasten layers of fabric with my clip, overlapped layers of the fabric are slid between the base and the platen. The lever is depressed and the pointed pins enter the fabric. While the pointed pins are entering the fabric the platen is rotating and the lever is rotating with it and sliding within the platen's tubular frame until the pawl engages the indent at which time the lever and platen rotate as a unit. Additional depression of the lever causes the knob to snap engage in the depressions and stop the rotation of the lever and platen. In this condition all of the pointed pins will be engaged in the fabric and will hold all the layers in fixed relationship to each other.

To open my clip and release it from the fabric there are two ways. A first method is to grasp the end 25 of the platen and raise it to rotate it clockwise about the studs causing the release of the knobs from the depression and consecutively to release the pressure between the rib and underside of the top side of the frame, disengagement of the pawl from the indent and moving the platen and lever apart. The other method involves applying pressure on the end 29 and the underside of the base by squeezing them simultaneously. The resultant force will cause the lever and platen to rotate on the studs and successively release the knobs from the depressions in the cheeks, pressure between the rib and underside of the top of the tubular frame, the pawl from the indent, and to rotate the lever with the pins away from the fabric previously pinned together.

Having thus described my invention I claim:

1. A self locking safety clip for overlapping layers of fabric, comprising a base having a flat horizontal solid portion and a bifurcated end with perpendicular spaced flexible cheeks, a platen having a multiple of elongated slots and a tubular end section integral therewith, said platen rotatably supported between and on said cheeks of said base, a lever having an end slidably retained within said tubular end section of said platen, a multiple of pointed pins fixed in said lever adapted to pass through and slide within said slots in said platen, and means on said tubular end section of said platen coacting with a top surface of said lever portion slidable within said tubular end section of the platen to keep said clip in locked, closed holding position.

2. A self locking safety clip for overlapping layers of fabric, comprising a base having a flat horizontal solid portion and a bifurcated end with perpendicular spaced flexible cheeks, a platen having a multiple of elongated slots and a tubular end section integral therewith, said platen rotatably supported between and on said cheeks of said base, a lever having an end slidably retained within said tubular end section of said platen, a multiple of pointed pins fixed in said lever adapted to pass through and slide within said slots in said platen, and means on said tubular end section of said platen coacting with a top surface of said lever portion slidable within said tubular end section of the platen to keep said clip in locked, closed holding position, said base having two parallel lines of serrations and a concave channel between them whereon the said fabric is molded due to the penetration of the pins through said fabric.

3. A self locking safety clip for overlapping layers of fabric, comprising a base having a flat horizontal solid portion and a bifurcated end with perpendicular spaced flexible cheeks, a platen having a multiple of elongated slots and a tubular end section integral therewith, said platen rotatably supported between and on said cheeks of said base, a lever having an end slidably retained within said tubular end section of said platen, a multiple of pointed pins fixed in said lever adapted to pass through and slide within said slots in said platen, and means on said tubular end section of said platen coacting with a top surface of said lever portion slidable within said tubular end section of the platen to keep said clip in locked, closed holding position, said base having two parallel lines of serrations and a concave channel between them whereon the said fabric is molded due to the penetration of the pins through said fabric, said pointed pins in said lever being of such length so that the points of all the pins will be in a horizontal plane within the concave channel when the lever is secured in locked position and holding said fabric.

4. A self locking safety clip for overlapping layers of fabric, comprising a base having a flat horizontal solid portion and a bifurcated end with perpendicular spaced flexible cheeks, a platen having a multiple of elongated slots and a tubular end section integral therewith, said platen rotatably supported between and on said cheeks of said base, a lever having an end slidably retained within said tubular end section of said platen, a multiple of pointed pins fixed in said lever adapted to pass through and slide within said slots in said platen, and means on said tubular end section of said platen coacting with a top surface of said lever portion slidable within said tubular end section of the platen to keep said clip in locked, closed holding position, said base having two parallel lines of serrations and a concave channel between them whereon the said fabric is molded due to the penetration of the pins through said fabric, said pointed pins in said lever being of such length so that the points of all the pins will be in a horizontal plane within the concave channel when the lever is secured in locked position and holding said fabric, and another pin fixed in said lever and slidable in a slot in said platen having a hooked end adapted to hook on an underside of said platen to limit the separation between said platen and lever when said clip is in open condition and thereby insure said pointed pins from being withdrawn from said slots.

5. A self locking safety clip for overlapping layers of fabric, comprising a base having a flat horizontal solid portion and a bifurcated end with perpendicular spaced flexible cheeks, a platen having a multiple of elongated slots and a tubular end section integral therewith, said platen rotatably supported between and on said cheeks of said base, a lever having an end slidably retained within said tubular end section of said platen, a multiple of pointed pins fixed in said lever adapted to pass through and slide within said slots in said platen, and means on said tubular end section of said platen coacting with a top surface of said lever portion slidable within said tubular end section of the platen to keep said clip in locked, closed holding position, said base having two parallel lines of serrations and a concave channel between them whereon the said fabric is molded due to the penetration of the pins through said fabric, said pointed pins in said lever being of such length so that the points of all the pins will be in a horizontal plane within the concave channel when the lever is secured in locked position and holding said fabric, and another pin fixed in said lever and slidable in a slot in said platen having a hooked end adapted to hook on an underside of said platen to limit the separation between said platen and lever when said clip is in open condition and thereby insure said pointed pins from being withdrawn from said slots, a pawl integral with said platen adapted to engage in an indent on said lever to coact simultaneously with the means on said lever and platen to keep said clip in holding position on said fabric.

6. A self locking safety clip for securing overlapping layers of fabric together comprising a base having a flat solid portion and a bifurcated end with perpendicular spaced flexible cheeks, studs secured in said cheeks, a platen having a multiple of elongated slots and a tubular end section integral therewith, said tubular end section having cam slots in sides thereof slidably and rotatably supporting said platen on said studs and between said cheeks of said base, a lever having an end slidably retained within said tubular end section of said platen, a multiple of pointed pins of progressive shortened lengths secured in said lever adapted to slide in said slots in said platen, another pin having a hook fixed in said lever slidable in another slot in said platen, said hook adapted to hook on an underside of said platen to limit the separation between the platen and lever, a pawl integral with said platen adapted to engage in an indent on said lever to arrest motion between said platen and lever, means on said tubular section of the platen and lever to apply pressure between said platen and lever to retain said pawl in the indent to hold said clip in locked condition on said fabric, said base having two lines of serrations and a concave channel between them, said fabric molded around said serrations by depressing the lever and forcing the pins through the fabric to lock the overlapping layers of fabric together.

References Cited by the Examiner

UNITED STATES PATENTS

| | | | |
|---|---|---|---|
| 2,510,250 | 6/1950 | Pereira et al. | 24—160 X |
| 2,625,725 | 1/1953 | Sampson | 24—160 |
| 2,968,852 | 1/1961 | Moonan | 24—160 |

FOREIGN PATENTS

| | | |
|---|---|---|
| 651,703 | 10/1928 | France. |
| 764,129 | 2/1934 | France. |

WILLIAM FELDMAN, *Primary Examiner.*

D. GRIFFIN, *Assistant Examiner.*